UNITED STATES PATENT OFFICE.

FRANKLIN H. KALBFLEISCH, OF BABYLON, NEW YORK.

SIZING AGENT AND METHOD OF MAKING SAME.

1,029,131.  Specification of Letters Patent.  Patented June 11, 1912.

No Drawing.  Application filed April 26, 1911. Serial No. 623,436.

*To all whom it may concern:*

Be it known that I, FRANKLIN H. KALBFLEISCH, a citizen of the United States, and a resident of Babylon, Suffolk county, New York, have invented a new and useful Manufacture of Sizing Agents, of which the following is a full, clear, and exact description, such as will enable others skilled in the art to which it appertains to embody the same in practice.

This invention relates to improvements in the production of and in sizing compounds, such as are employed in the filling or glazing of paper, and in a more concrete sense it proposes a way of increasing the proportion in a soluble sizing agent of the content available as a precipitant for the rosin-size, as by combining alumina sulfate which has been deprived to a commercial extent or nearly so of its associated water with a compound, such as sulfate of magnesia, which may be readily dehydrated to a relatively high degree, which is compatible in that state with sulfate of alumina, and which can react with rosin size in a manner similar to sulfate of alumina to form an insoluble sizing-agent containing the rosin and the mineral, apart from the residual soluble sulfates.

As an introductory to a more detailed statement of the novel features underlying the commercial utility of this invention, it may be preliminarily noted that, for various reasons well understood by those skilled in this art, it is desirable to render available a cheap sizing and loading agent as highly proportioned in the mineral size-precipitating substance relative to the water content as may be practicable, and to do so in an essentially economical manner as free as possible from the numerous commercial difficulties naturally associated with such a proposal, has been the goal for which those industrially engaged in this branch of the art have long striven.

Heretofore a sizing agent in a condition permitting transportation to paper mills has been prepared from the commercially available solutions of sulfate of alumina deprived of free acid (usually resulting from the action of sulfuric acid on bauxite) by a process of evaporation, but in a commercial way it is not economically practicable to carry this evaporation to a point at which the aluminum content (estimated as $Al_2O_3$) exceeds about 16% of the product. Attempts at a higher dehydration are frustrated or rendered too costly to be practicable by reason of various volatilization losses and by sundry other manufacturing difficulties. The use of alum in paper-making is due primarily to the fact that when a solution of alum comes in contact with one of rosin-size, there is formed a bulky, adhesive, gelatinous precipitate, composed of alumina and rosin, which adheres to the fibers and dries down to a sort of water-repellent varnish giving a hard, finished surface to the paper sized therewith. Other things being equal the value of an alum for the purpose of paper-making is usually held to vary with the percentage of mineral (alumina) present. I have found that $MgSO_4$ in the presence of alumina sulfate possesses similar properties. Now this invention is based upon my further discovery that ordinary aluminum sulfate containing the usual large percentage of water may be combined with magnesium sulfate from which much if not nearly all of the water has been evaporated, with the consequence that the metallic oxid content (available as a precipitant for the rosin size) of a given quantity of the resultant product may be readily increased from the aforesaid 16% or thereabout to 22% and over, or, so to speak, a large portion of the water heretofore inseparably combined (in a practical sense) with the sulfate of aluminum may be replaced by a more completely dehydrated magnesium sulfate, thus yielding a product which enables a large amount of mineral to be transported without involving freight charges on an amount of weight representing only an undesirable water content.

In carrying out one embodiment of this invention, the solution deprived of "free" acid and free from soluble sulfates such as sodium sulfate incapable of acting as precipitants for the rosin-size obtained during the usual production of aluminum sulfates, may be evaporated to expel water to such an extent as may be commercially practicable without the losses aforesaid, i. e., until the content of $Al_2O_3$ equals about 16%, but it will perhaps be more convenient to evaporate to a slightly less degree until a somewhat thin syrup results. Assuming that approximately 22% of metallic oxid content is desired, to the resultant syrupy mass while hot may be added a quantity (say about half the weight estimated for the alum cake assuming it contains about 16% $Al_2O_3$) of sulfate of magnesia which has been still more completely dehydrated, (preferably magnesium sulfate in powdered form which has been entirely deprived of its water of crystallization) and the liquor stirred until homogeneous and the heating may be continued to effect further evaporation if desired to a thicker syrup, and thereafter the resultant mixture may be run into suitable vessels to cool and harden in the form of a solid cake which may be readily handled and in which the proportion of water relatively to the metallic oxids available as sizing precipitants is materially less than in the case of ordinary solid aluminum sulfate.

While the foregoing is in some respects the preferred way of practicing my invention, certain modifications are also contemplated. Thus, the sulfates of aluminum and magnesium may initially be brought together in the form of solutions which may then be evaporated together to a syrupy consistency and ultimately cooled and solidified, or the commercially evaporated aluminum sulfate may be ground and mixed with the more completely dehydrated ground magnesium sulfate. The first-mentioned method is preferred, however, as it is more readily controlled in producing a very uniform composition.

I therefore claim as my invention and desire to secure by Letters Patent:

1. A process of the nature disclosed for producing a hard non-porous sizing compound containing a large amount of magnesium sulfate intimately mixed with aluminum sulfate and containing a relatively small quantity of water, comprising the step of preparing a liquor of a thick syrupy consistency containing not materially more than 30% water and comprising about 22% of a mixed oxid content including oxids of alumina and magnesium, and then cooling the same to form a hard cake.

2. A process of the nature disclosed for producing a hard non-porous sizing compound completely soluble in water and containing a large amount of magnesium sulfate intimately mixed with as much alumina sulfate and containing a relatively small quantity of water, which comprises the addition of dehydrated sulfate of magnesium to alum-cake devoid of free acid to form a hot concentrated solution of the mixed sulfates, and then cooling the same into a hard cake.

3. A process of the nature disclosed for producing a non-porous sizing compound containing about 22% of mixed metallic oxids available as precipitants for rosin-size, comprising the step of preparing a thick syrupy liquor of about two parts of alum cake and about one part of dehydrated magnesium sulfate, and then forming the same into a hard cake.

4. A sizing composition of the nature disclosed characterized by a hard non-porous structure about 22% of which constitutes a metallic oxid content available as a precipitant for rosin-size, said composition comprising about 30% water and the balance formed of mixed metallic sulfates of which $Al_2(SO_4)_3$ constitutes about one-half.

5. A sizing composition of the nature disclosed characterized by a hard non-porous structure and having a metallic oxid content available as a precipitant for rosin-size of materially more than 16%, said composition containing materially less than 48% of water, and the balance formed of mixed metallic sulfates including $MgSO_4$ and $Al_2(SO_4)_3$, the percentage content of the latter being approximately equal to the percentage content of the water.

6. A process of the nature disclosed for producing an intimate mixture of sulfates of alumina and magnesia containing a relatively low percentage of water, comprising evaporating a solution of sulfate of alumina to drive off the readily expelled water, then adding thereto dehydrated sulfate of magnesia to form a syrupy liquor, and thereafter cooling the mixture to form a hard cake.

7. A sizing composition of the nature disclosed characterized by a hard non-porous structure and composed, together with some water, of sulfate of alumina intimately mixed with a material amount of sulfate of magnesia such that the metallic oxid content available as a precipitant for rosin-size will approximate 22%.

8. A sizing composition free from soluble sulfates incapable of acting as precipitants for rosin-size characterized by a hard structure and containing a metallic oxid content of about 22% available as a precipitant for rosin-size, said composition comprising about one part of $Al_2(SO_4)_3$ and one part of magnesium sulfate.

9. A sizing composition of the nature disclosed characterized by a hard non-porous structure and containing a mixed metallic oxid content of about 22% available as a precipitant for rosin-size, said composition comprising about one part of $Al_2(SO_4)_3$ deprived of free acid and one part of magnesium sulfate.

In testimony that I claim the foregoing as my invention, I have hereunto affixed my signature in the presence of the two subscribing witnesses, this 25th day of April, 1911.

FRANKLIN H. KALBFLEISCH.

Witnesses:
 ALBERT F. NATHAN,
 M. A. FOWLER.